United States Patent
Langley et al.

(10) Patent No.: US 11,929,517 B2
(45) Date of Patent: Mar. 12, 2024

(54) TRACTION BATTERY SECURING ASSEMBLY AND METHOD

(71) Applicant: Ford Global Technologies, LLC, Dearborn, MI (US)

(72) Inventors: Derek Langley, Dearborn, MI (US); Dave Moschet, Novi, MI (US); Micah Smith, Detroit, MI (US); Melissa Kathryn Christensen, New Hudson, MI (US); Brent Zapczynski, Dearborn, MI (US); Michael Luchtman, Canton, MI (US); Saravanan Paramasivam, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 17/495,695

(22) Filed: Oct. 6, 2021

(65) Prior Publication Data
US 2023/0106251 A1 Apr. 6, 2023

(51) Int. Cl.
*B60K 1/04* (2019.01)
*H01M 50/159* (2021.01)
*H01M 50/204* (2021.01)
*H01M 50/262* (2021.01)

(52) U.S. Cl.
CPC ............ *H01M 50/262* (2021.01); *B60K 1/04* (2013.01); *H01M 50/159* (2021.01); *H01M 50/204* (2021.01); *B60K 2001/0438* (2013.01); *H01M 2220/20* (2013.01)

(58) Field of Classification Search
CPC ............ H01M 50/262; H01M 50/159; H01M 2220/20; H01M 50/204; B60K 1/04
See application file for complete search history.

(56) References Cited

U.S. PATENT DOCUMENTS

| 6,509,114 B1 * | 1/2003 | Nakai ............... H01M 10/0525 429/57 |
| 11,005,137 B2 | 5/2021 | Dunlap et al. |
| 11,038,236 B2 * | 6/2021 | Montgomery ...... H01M 50/244 |
| 2010/0294580 A1 * | 11/2010 | Kubota ............... H01M 10/625 180/68.1 |
| 2019/0157642 A1 * | 5/2019 | Toyota ..................... B60K 1/04 |
| 2020/0335743 A1 | 10/2020 | Gupta et al. |
| 2021/0175480 A1 | 6/2021 | White et al. |

FOREIGN PATENT DOCUMENTS

CN 212907891 U 4/2021

\* cited by examiner

*Primary Examiner* — Jason D Shanske
*Assistant Examiner* — James J Triggs
(74) *Attorney, Agent, or Firm* — David B. Kelley; Carlson, Gaskey & Olds, P.C.

(57) ABSTRACT

A battery pack assembly includes, among other things, a tray, a lid secured to the tray to provide an enclosure having an interior, at least one battery module disposed within the interior, a cross-member disposed within the interior adjacent to the at least one battery module, and a stanchion secured to the cross-member. The stanchion disposed entirely within the interior. The assembly further includes a fastener that extends through an opening in the lid to engage the stanchion.

19 Claims, 4 Drawing Sheets

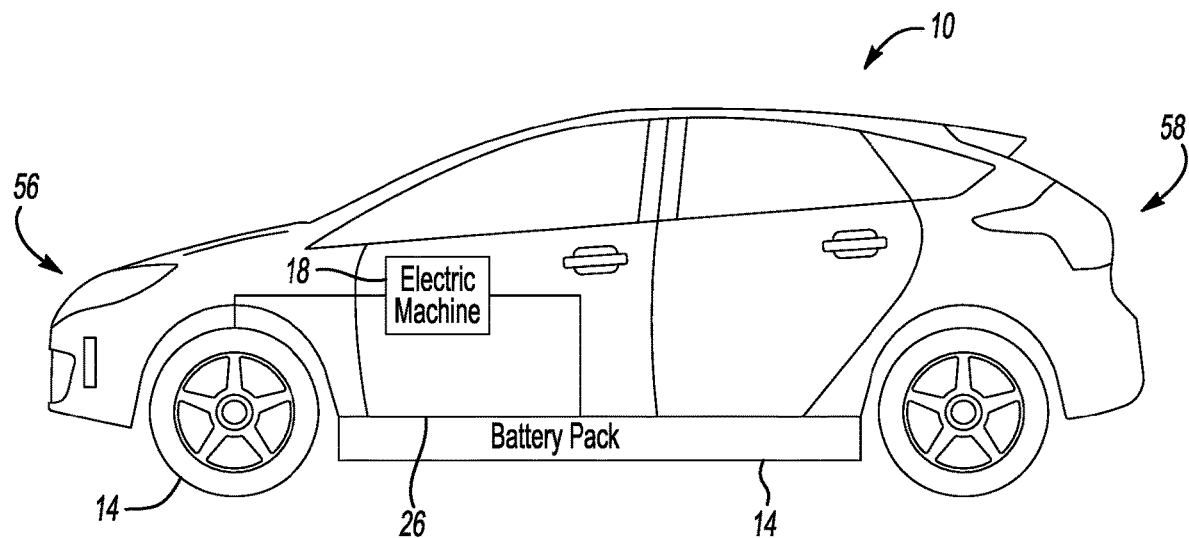
_Fig-1_
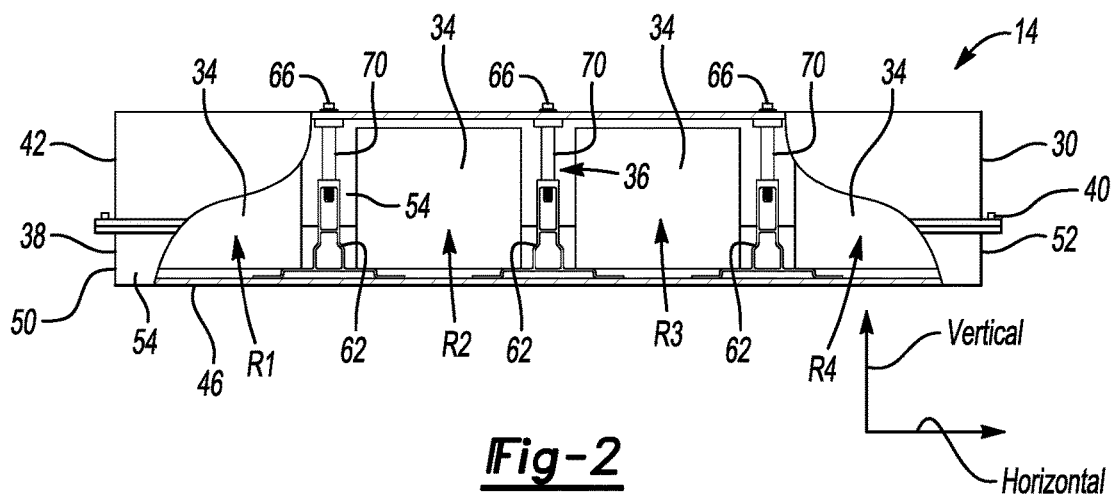
_Fig-2_

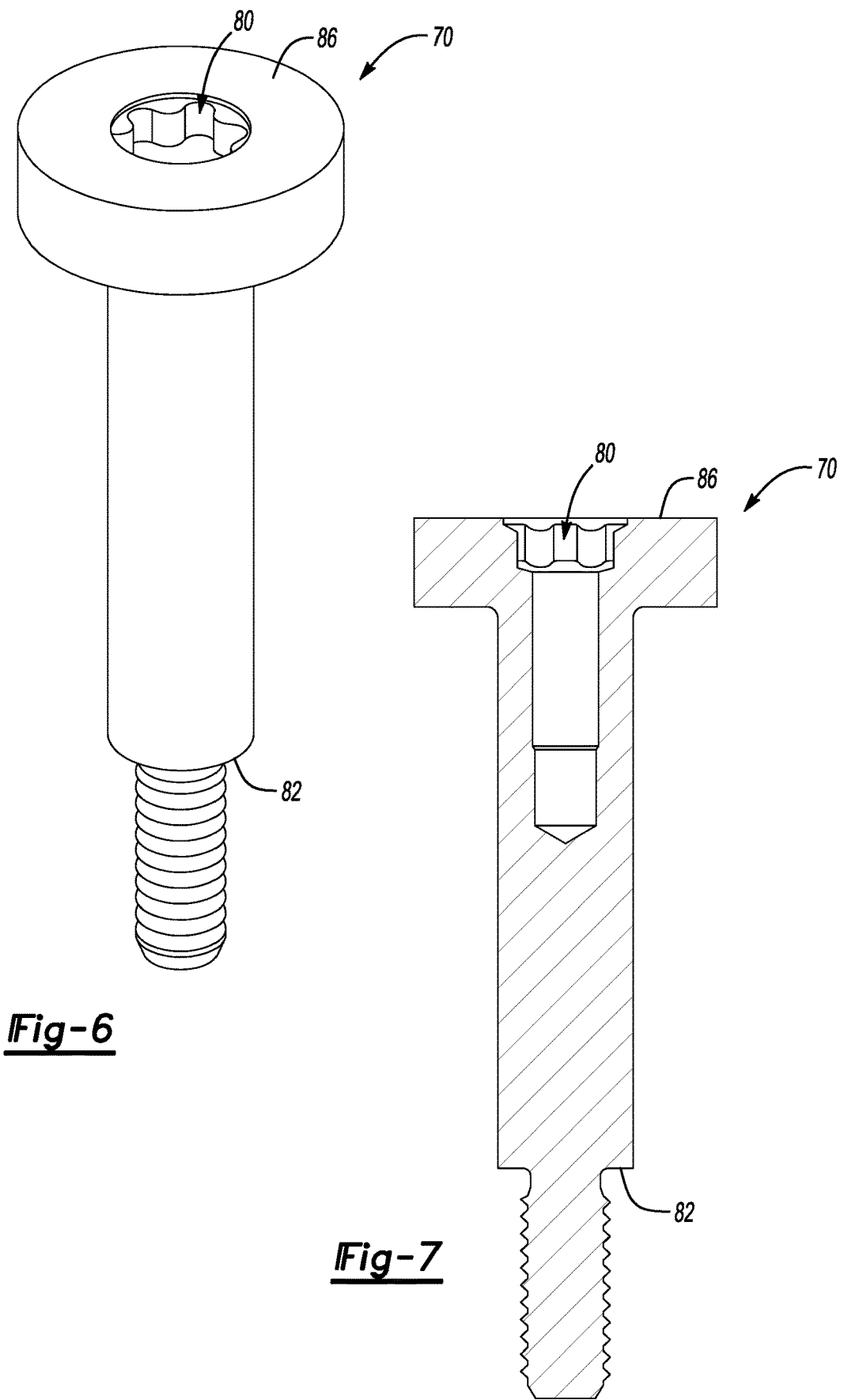

TRACTION BATTERY SECURING ASSEMBLY AND METHOD

TECHNICAL FIELD

This disclosure relates generally to securing portions of a traction battery and, more particularly, to securing areas of an enclosure relative to components within the enclosure.

BACKGROUND

Electrified vehicles differ from conventional motor vehicles because electrified vehicles can be driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

A battery pack assembly according to an exemplary aspect of the present disclosure includes, among other things, a tray, a lid secured to the tray to provide an enclosure having an interior, at least one battery module disposed within the interior, a cross-member disposed within the interior adjacent to the at least one battery module; and a stanchion secured to the cross-member. The stanchion disposed entirely within the interior. The assembly further includes a fastener that extends through an opening in the lid to engage the stanchion.

In another example of the foregoing assembly, the fastener threadably engages the stanchion.

In another example of any of the foregoing assemblies, the stanchion has a threaded bore. The fastener is received within the threaded bore when threadably engaging the stanchion.

In another example of any of the foregoing assemblies, no portion of the stanchion extends through the opening in the lid.

In another example of any of the foregoing assemblies, the stanchion threadably engages the cross-member.

In another example of any of the foregoing assemblies, the stanchion includes an internal drive.

In another example of any of the foregoing assemblies, a portion of the lid is clamped against an uppermost surface of the stanchion when the fastener is engaging the stanchion.

In another example of any of the foregoing assemblies, the tray further includes a forward wall, an aft wall, and opposing side walls extending horizontally from the forward wall to the aft wall. The cross-member extends along a cross-member axis between the opposing side walls of the tray.

In another example of any of the foregoing assemblies, fasteners secure the lid to the tray. The fasteners are distributed circumferentially about a perimeter of the enclosure.

In another example of any of the foregoing assemblies, the stanchion is secured to an upwardly facing surface of the cross-member.

Another example of any of the foregoing assemblies includes a sealing washer that is compressed by the fastener.

In another example of any of the foregoing assemblies, the lid is aluminum and the stanchion is steel.

A method of securing portions of a traction battery pack includes, among other things, housing a component of the traction battery pack within an interior of an enclosure of the traction battery pack, and securing a stanchion to a cross-member within the interior. The method further includes securing a lid of the enclosure to the stanchion using a fastener that extends through an opening in the lid. The stanchion is disposed entirely within the interior when securing the lid to the stanchion.

In another example of the foregoing method, the stanchion threadably engages the cross-member.

In another example of any of the foregoing methods, the fastener threadably engages the stanchion.

In another example of any of the foregoing methods, no portion of the stanchion extends through the opening.

Another example of any of the foregoing methods includes sandwiching the lid between the stanchion and the fastener.

Another example of any of the foregoing methods includes engaging an internal drive of the stanchion with a torque tool when securing the stanchion to the cross-member.

In another example of any of the foregoing methods, he stanchion is secured to an upwardly facing surface of the cross-member.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a side view of an electrified vehicle.

FIG. 2 illustrates a schematic view of a battery pack from the electrified vehicle of FIG. 1 with selected portions of an enclosure removed to show battery modules and cross-members within an interior of the enclosure.

FIG. 6 illustrates a perspective view of a stanchion from the assembly of FIG. 3.

FIG. 7 illustrates a section view taken at line 7-7 in FIG. 6.

DETAILED DESCRIPTION

Figure 3:
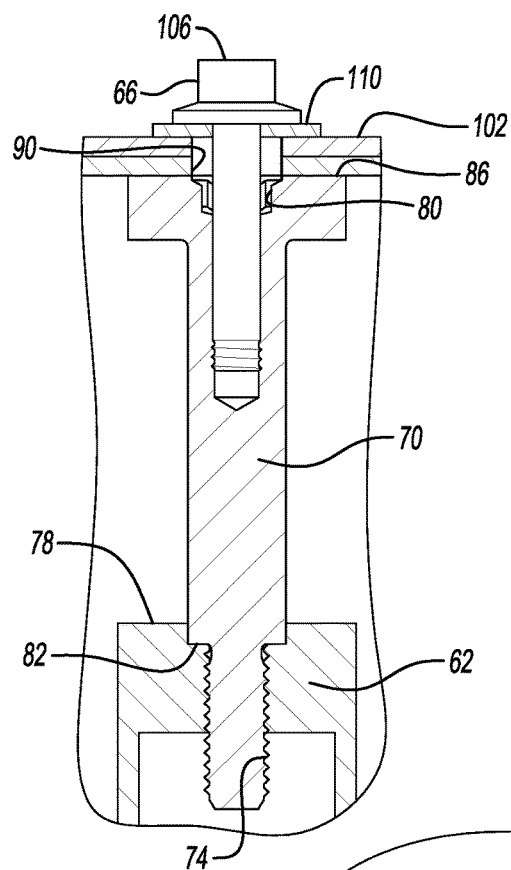
FIG. 3 illustrates a close-up section view of an assembly that couples the enclosure to one of the cross-members.

Electrified vehicles include at least one traction battery pack. This disclosure relates to securing portions of the traction battery pack.

A typical traction battery pack includes an enclosure having an interior. Many components are held within the interior. Securing portions of the enclosure can help to reduce noise, vibration, harshness (NVH) issues associate with the enclosure.

With reference to FIG. 1, an electrified vehicle 10, in an exemplary non-limiting embodiment, includes a traction battery pack 14 that powers an electric machine 18. The electrified vehicle 10 further includes wheels 22 driven by the electric machine 18. The battery pack 14 can power the electric machine 18, which converts electric power to torque to drive the wheels 22. The battery pack 14 can be a relatively high-voltage battery.

The battery pack 14 is, in the exemplary embodiment, secured to an underbody 26 of the electrified vehicle 10. The battery pack 14 could be located elsewhere on the electrified vehicle 10 in other examples. The battery pack 14 can be secured to the underbody 26 using straps and mechanical fasteners, for example.

The electrified vehicle 10 is an all-electric vehicle. In other examples, the electrified vehicle 10 is a hybrid electric vehicle, which selectively drives wheels using torque provided by an internal combustion engine instead, or in addition to, an electric machine. Generally, the electrified vehicle 10 could be any type of vehicle having a traction battery pack.

Referring now to FIG. 2 with continuing reference to FIG. 1, the battery pack 14 includes an enclosure 30 housing battery modules 34.

The enclosure 30, in the exemplary non-limiting embodiment includes a tray 38 and lid 42. The lid 42 is secured to the tray 38 to provide an interior 36. The battery modules 34 are located within the interior 36 along with other components. The lid 42, the tray 38, or both, can be a polymer or polymer-based material.

A plurality of mechanical fasteners 40 are distributed about a periphery of the battery pack 14. The mechanical fasteners 40 secure a flange of the tray 38 to a flange of the lid 42.

A sealing interface can be provided between the fasteners 40 and the interior 36. The fasteners 40 are disposed outside the sealing interface. That is, when the lid 42 is secured to the tray 38, a circumferentially continuous seal is maintained about a perimeter of the interior 36.

The exemplary tray 38 includes a floor 46, a forward wall 50, an aft wall 52, and opposing side walls 54 that extend horizontally from the forward wall to the aft wall 52. Vertical and horizontal, for purposes of this disclosure, are with reference to ground and the ordinary orientation of the electrified vehicle 10 during operation. Forward and aft are also with reference to the orientation of the electrified vehicle 10, that is, the forward wall 50 is closer to a front 56 of the electrified vehicle 10 than the aft wall 52. Also, the aft wall 52 is closer to a rear 58 of the electrified vehicle 10 than the forward wall 50.

A plurality of cross-members 62 are disposed within the interior 36 of the enclosure 30. The cross-members 62 each extend longitudinally along a respective cross-member axis, which extends in a cross-vehicle direction and in a direction perpendicular to the plane of the page in FIG. 2. The cross-members 62, in the exemplary embodiment, extend from one of the side walls 54 to the opposing side wall 54. That is, in the exemplary embodiment, the cross-members 62 directly contact both of the side walls 54.

The cross-members 62 are each spaced a distance from each other and from both the forward wall 50 and the aft wall 52 of the tray 38. The cross-members 62 enhance the structural integrity of the battery pack 14. In the exemplary embodiment, the cross-members 62 are also utilized to support the battery modules 34 at a position where the battery modules 34 are elevated with respect to the floor 46 of the tray 38.

The battery modules 34, in the exemplary embodiment, are arranged in four rows R1, R2, R3, and R4. R1 is forward of rows R2-R4. R2 is forward of rows R3 and R4. Row R3 is forward of row R4. Along a longitudinal axis of the electrified vehicle 10, one of the cross-members 62 is used to support the battery modules 34 in rows R1 and R2. Another of the cross-members 62 is used to support the battery modules 34 in rows R2 and R3. The remaining cross-member 62 is utilized to support the battery modules 34 in rows R3 and R4.

Other exemplary battery packs could include other arrangements of battery modules and cross-members. Another battery pack could, for example, include more than four rows of battery modules. Yet another battery pack could include more than one vertical tier of battery modules.

Areas of the enclosure 30 that span a long way without being secured to another structure may be more prone to NVH issues than other areas of the enclosure 30. Securing areas of the enclosure 30 can also help the enclosure 30 withstand pressure increases within the interior 36. However, adding fasteners to provide the desired securing can introduce leak paths to the interior 36.

In the exemplary embodiment, a plurality of fasteners 66 secure the lid 42 to a respective stanchion 70 within the interior 36. Securing the lid 42 to the stanchions 70 can decrease the distances that the lid 42 spans thus helping to mitigate NVH issues associated with the lid 42, and helping to withstand higher pressures within the interior 36. In particular, reducing the distance that the lid 42 is required to span can increase local frequency modes of the lid 42 and prevent sagging of the lid 42.

Figure 4:
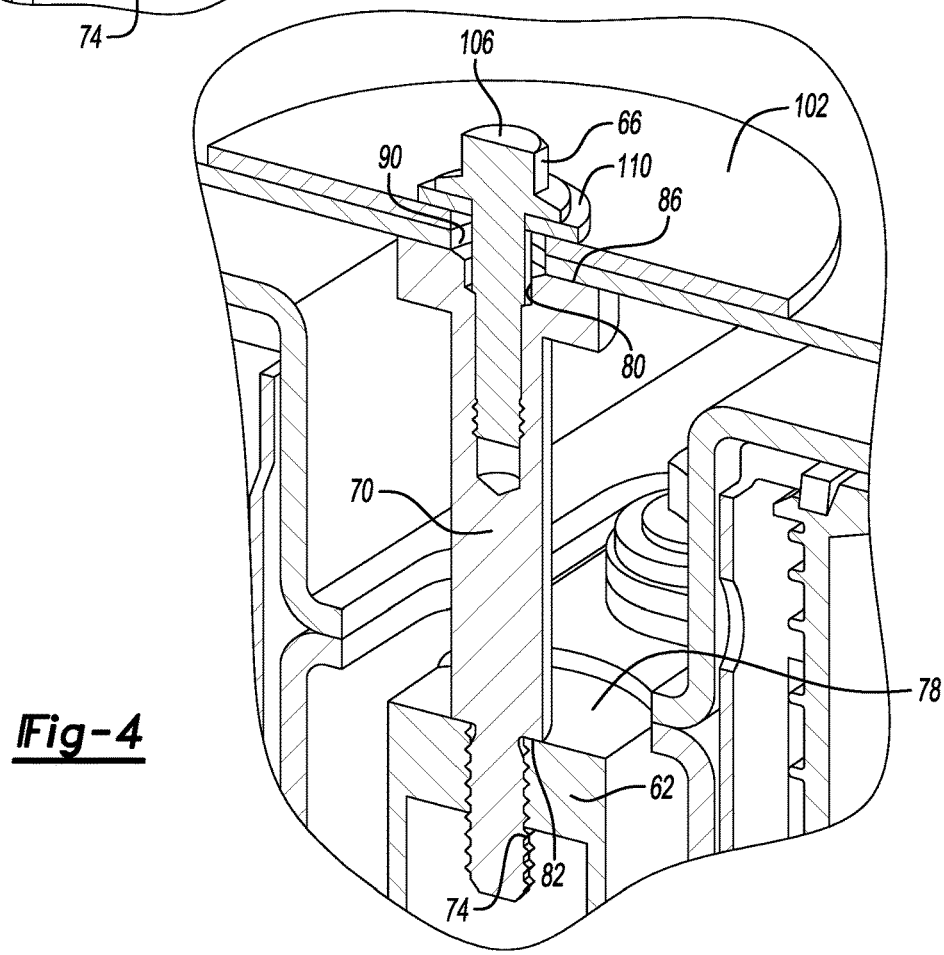
FIG. 4 illustrates a perspective view of the section from FIG. 3.
Figure 5:
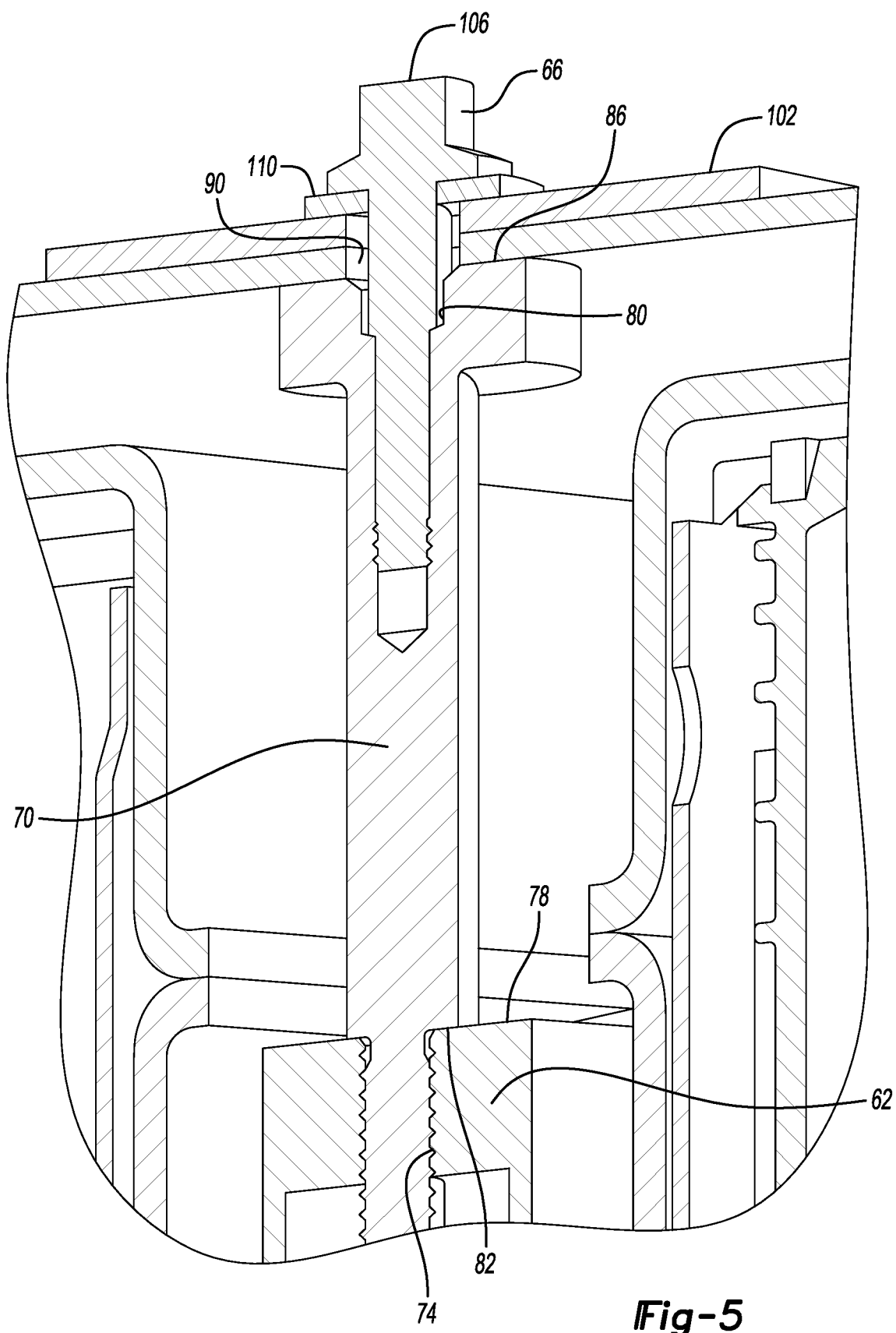
FIG. 5 illustrates another perspective view of the section from FIG. 3.

With reference now to FIGS. 3-7 and continuing reference to FIGS. 1 and 2, the stanchion 70, in the exemplary embodiment is secured to the cross-members 62. In particular, the stanchion 70 threadably engages the cross-member 62 and is received within a bore 74 of the cross-member 62. The bore 74 opens to an upwardly facing surface 78 of the cross-member 62. The stanchion 70 is secured to the upwardly facing surface 78. In this example, the stanchion 70 includes thread forming threads that form threads within the cross-member 62 as the stanchion 70 is torqued down. In another example, the bore 74 could be threaded prior to the receipt of the stanchion 70.

To threadably secure the stanchion 70, the stanchion 70 includes an internal drive 80. Prior to securing the lid 42 to the tray 38, a torque tool can be used to torque down the stanchion to the cross-member 62 until a lower shoulder 82 of the stanchion 70 rests against the upwardly facing surface 78 of the cross-member 62. The lid 42 can then be placed on the tray 38 such that the lid 42 rests on an upper surface 86 of the stanchion 70.

The upper surface 86 is a vertically uppermost surface of the stanchion 70 in this example. Vertical is with reference to ground an ordinary orientation of the battery pack 14 within the vehicle 10 during operation. The stanchion 70 is produced such that the upper surface 86 and the lower shoulder 82 have a high degree of parallelism, which can facilitate properly locating the lid 42.

After placing the lid 42, the fastener 66 is inserted through an opening 90 in the lid 42 and is torqued down to threadably engage the threaded bore 74 within the stanchion 70. A lid 42 reinforcement 102 can be disposed about the opening 90 and secured directly to the lid 42. The lid reinforcement 102 can help to strengthen areas where the lid 42 interfaces with the fastener 66.

As the fastener 66 is torqued down, a head 106 of the fastener 66 clamps a washer 110, the lid reinforcement 102, and the lid 42 against the upper surface 86 of the stanchion 70. The lid 42 is sandwiched between the head 106 and the upper surface 86 of the stanchion 70.

The washer 110 is a sealing washer that has a polymer-based portion. As the washer 98 is compressed, the polymer-based portion, in particular, helps to seals an interface between the fastener 66 and the lid reinforcement 102.

Notably, no portion of the stanchion 70 extends through the opening 90 in the lid 42. That is, the stanchion 70 is contained entirely with the interior 36. This can reduce a number of interfaces need to be sealed in order to block flow of gas and contaminates through the opening 90 between the interior 36 and areas outside the battery pack 14. Further, the fastener 66 and the stanchion 70 are substantially isolated from the underbody 26 of the vehicle 10.

In this example, the stanchion 70 is steel and the lid 42 of the enclosure 30 is aluminum.

Features of the disclosed examples include reducing sag of the lid or other areas of the enclosure that can lead to the enclosure undesirably contacting components within the enclosure. Another feature is enhancing the pressure carrying capability of a battery pack enclosure without needing to increase a thickness of the lid and tray.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
   a tray;
   a lid secured to the tray to provide an enclosure having an interior;
   at least one battery module disposed within the interior;
   a cross-member disposed within the interior adjacent to the at least one battery module;
   a stanchion secured to the cross-member, the stanchion disposed entirely within the interior; and
   a fastener that extends through an opening in the lid to engage the stanchion.

2. The traction battery assembly of claim 1, wherein the fastener threadably engages the stanchion.

3. The traction battery assembly of claim 1, wherein the stanchion has a threaded bore, wherein the fastener is received within the threaded bore when threadably engaging the stanchion.

4. The traction battery assembly of claim 1, wherein no portion of the stanchion extends through the opening in the lid.

5. The traction battery assembly of claim 1, wherein the stanchion threadably engages the cross-member.

6. The traction battery assembly of claim 1, wherein the stanchion includes an internal drive provided by a shape recessed from an uppermost surface of the stanchion, the internal drive configured to receive a tool that rotates the stanchion, wherein the stanchion includes threads separate from the internal drive, the threads configured to threadably engage the fastener.

7. The traction battery assembly of claim 1, wherein a portion of the lid is clamped against an uppermost surface of the stanchion when the fastener is engaging the stanchion.

8. The traction battery assembly of claim 1, wherein the tray further includes a forward wall, an aft wall, and opposing side walls extending horizontally from the forward wall to the aft wall, wherein the cross-member extends along a cross-member axis between the opposing side walls of the tray.

9. The traction battery assembly of claim 1, wherein a plurality of fasteners secure the lid to the tray, the plurality of fasteners distributed circumferentially about a perimeter of the enclosure.

10. The traction battery assembly of claim 1, wherein the stanchion is secured to an upwardly facing surface of the cross-member.

11. The traction battery assembly of claim 1, further comprising a sealing washer that is compressed by the fastener.

12. The traction battery assembly of claim 1, wherein the lid is aluminum and the stanchion is steel.

13. A method of securing portions of a traction battery pack, comprising:
   housing a component of the traction battery pack within an interior of an enclosure of the traction battery pack;
   securing a stanchion to a cross-member within the interior; and
   securing a lid of the enclosure to the stanchion using a fastener that extends through an opening in the lid, the stanchion is disposed entirely within the interior when securing the lid to the stanchion.

14. The method of claim 13, wherein the stanchion threadably engages the cross-member.

15. The method of claim 13, wherein the fastener threadably engages the stanchion.

16. The method of claim 13, wherein no portion of the stanchion extends through the opening.

17. The method of claim 13, further comprising sandwiching the lid between the stanchion and the fastener.

18. The method of claim 13, further comprising engaging an internal drive of the stanchion with a tool when securing the stanchion to the cross-member, the internal drive provided by a shape recessed from an uppermost surface of the stanchion configured to receive the tool.

19. The method of claim 13, wherein the stanchion is secured to an upwardly facing surface of the cross-member.

* * * * *